(12) United States Patent
Stoiber et al.

(10) Patent No.: US 8,063,598 B2
(45) Date of Patent: Nov. 22, 2011

(54) SYNCHRONOUS MOTOR, ENCODERLESS MOTOR SYSTEM AND A METHOD FOR OPERATING AN ENCODERLESS MOTOR SYSTEM WITH A SYNCHRONOUS MOTOR

(75) Inventors: Dietmar Stoiber, Fürth (DE); Bernd Wedel, Nürnberg (DE)

(73) Assignee: Siemens Aktiengesellschaft, München (DE)

( * ) Notice: Subject to any disclaimer, the term of this patent is extended or adjusted under 35 U.S.C. 154(b) by 465 days.

(21) Appl. No.: 12/375,959

(22) PCT Filed: Jul. 26, 2007

(86) PCT No.: PCT/EP2007/057723
§ 371 (c)(1),
(2), (4) Date: Feb. 2, 2009

(87) PCT Pub. No.: WO2008/015157
PCT Pub. Date: Feb. 7, 2008

(65) Prior Publication Data
US 2009/0261765 A1    Oct. 22, 2009

(30) Foreign Application Priority Data
Aug. 3, 2006   (DE) .................. 10 2006 036 288

(51) Int. Cl.
*H02P 1/04* (2006.01)
*H02K 1/00* (2006.01)

(52) U.S. Cl. ......... 318/400.33; 310/156.74; 310/156.75; 310/156.76; 310/181; 310/162

(58) Field of Classification Search ............. 318/400.33; 310/156.74, 156.75, 156.76, 456.78, 162, 310/181
See application file for complete search history.

(56) References Cited

U.S. PATENT DOCUMENTS

| | | | |
|---|---|---|---|
| 5,099,184 A * | 3/1992 | Hornung et al. | 318/375 |
| 6,495,937 B2 | 12/2002 | Bien-Air | |
| 7,081,864 B2 * | 7/2006 | Okamura et al. | 343/788 |

FOREIGN PATENT DOCUMENTS

| | | |
|---|---|---|
| DE | 101 56 243 A1 | 6/2003 |
| DE | 102 20 164 A1 | 10/2003 |
| EP | 0 457 389 A1 | 11/1991 |
| JP | 56053563 A * | 5/1981 |
| JP | 63144746 A * | 6/1988 |
| SU | 855545 B * | 8/1981 |

OTHER PUBLICATIONS

Thomas A. Nondahl, et al.; A Permanent-Magnet Rotor Containing an Electrical Winding to Improve Detection of Rotor Angular Position, IEEE Transactions on Industry Applications, vol. 35, No. 4, Jul./Aug. 1999: Others: 1999; US.

* cited by examiner

*Primary Examiner* — Bentsu Ro
*Assistant Examiner* — Jorge Carrasquillo
(74) *Attorney, Agent, or Firm* — Henry M. Feiereisen; Ursula B. Day

(57) ABSTRACT

The invention relates to a synchronous motor (12) with a number of stator coils (15), with a rotor (16) with at least one permanent magnet (17), which induces a rotor magnetic field in a useful flux direction and with at least one coil winding (20), which is fitted on the rotor in order to induce a resultant magnetic field as a result of an alternating magnetic fields which is applied with the aid of the stator coils, in the direction of a winding axis of the coil winding, so that a resultant inductance of the stator coils (15) with respect to a direction of the winding axis is different given different positions of the rotor (16).

14 Claims, 2 Drawing Sheets

SYNCHRONOUS MOTOR, ENCODERLESS MOTOR SYSTEM AND A METHOD FOR OPERATING AN ENCODERLESS MOTOR SYSTEM WITH A SYNCHRONOUS MOTOR

BACKGROUND OF THE INVENTION

The invention relates to a synchronous motor, in particular an encoderless synchronous motor. Furthermore, the invention relates to an encoderless motor system with such a synchronous motor, and a method for operating the encoderless motor system.

A synchronous motor normally has a number of stator coils which are arranged in the vicinity of an armature with at least one permanent magnet in order to drive the armature. The armature is normally designed in the form of a rotor, the permanent magnet being arranged on the rotor so that it produces an armature magnetic field in a radial direction with respect to a rotor axis of the rotor. The armature of the synchronous motor is driven by applying an appropriate stator current to each of the stator coils with the help of appropriate control signals, thus giving rise to a resulting drive magnetic field. The stator currents are controlled in such a way that the drive magnetic field runs essentially perpendicular to the direction of the armature magnetic field produced by the permanent magnet in order to produce a greatest possible torque. In order to always apply the stator currents so that the direction of the magnetic field produced by the stator coils runs perpendicular to the armature magnetic field, the position of the armature or rotor position must be known. To operate the synchronous motor, the position of the armature must therefore be continuously determined or estimated so that the stator coils can be optimally controlled depending on the determined position of the armature. Position detectors are normally provided to determine the position of the armature or rotor position.

In the case of an encoderless synchronous motor, the position of the rotor is estimated with the help of an anisotropy of a resulting inductance in the stator coils of the stator, i.e. when the synchronous motor is operating, different resulting inductances can be measured in the stator coils depending on the rotor position, by means of which the position of the armature or rotor can be estimated. To do this, measuring signals are superimposed on the control signal for applying the stator currents for the stator coils so that, in addition to the drive magnetic field, an alternating magnetic field is produced, wherein the current flows through the stator coils produced by the measuring signals depend on the resulting rotor-position-dependent inductance of the synchronous motor. Because, as previously described, the resulting inductance of the synchronous motor depends on the position of the rotor, the rotor position can be estimated from the measuring currents which are produced by the measuring signals.

In order to determine the rotor position as accurately as possible, it is necessary that the characteristic of the resulting inductance of the synchronous motor changes as much as possible depending on the rotor position, i.e. it is anisotropic, the difference of the resulting inductance between one direction of the armature magnetic field and a different direction thereto being as great as possible. However, with conventional rotors, the low anisotropy of the resulting inductance leads to the rotor position only being estimated inaccurately, so that the drive magnetic field does not run exactly perpendicular to the armature magnetic field. As a result, the synchronous motor cannot be operated with the optimum torque.

SUMMARY OF THE INVENTION

It is the object of the present invention to provide a synchronous motor, the anisotropy of which with regard to the characteristic of the resulting inductance in the stator coils which depends on the direction of the armature magnetic field, allows the position of the armature to be estimated with sufficient accuracy. Furthermore, it is the object of the present invention to provide an encoderless motor system with a synchronous motor and a method for operating such an encoderless motor system, with which the position of the armature can be estimated as accurately as possible.

According to a first aspect of the present invention, a synchronous motor is provided which comprises a number of stator coils and an armature with at least one permanent magnet which produces a magnetic field in a main flux direction. At least one coil winding is mounted on the armature in order to induce a resulting magnetic field by means of an alternating magnetic field applied with the help of the stator coils, in the direction of a winding axis of the coil winding, so that a resulting inductance of the stator coils with respect to the direction of the winding axis is different for different positions of the rotor.

By providing the coil winding on the armature, the anisotropy of the characteristic of the resulting inductance in the stator coils, which is dependent on the position of the armature, is increased. The additional coil winding on the armature leads to the resulting inductance in the stator coils with respect to the direction of a winding axis of the coil winding being considerably reduced compared with different directions thereto.

The resulting inductance of the stator coils with respect to a defined direction can be determined by applying the measuring signals to the stator coils so that the alternating magnetic field is applied in the defined direction. The measuring signals give rise to associated current flows through the stator coils which depend on the resulting inductance. If the measuring signals therefore give rise to an alternating magnetic field in the direction of the winding axis of the coil winding, then measuring currents associated with each of the measuring signals flow through the stator coils, said measuring currents being overall greater than the currents which the measuring signals would produce if they were to generate the alternating magnetic field in a different direction thereto.

The coil winding is preferably short-circuited. By this means, the alternating magnetic field generated by the stator coils, which runs in the direction of the winding axis of the coil winding, can produce due to the current induced therein a magnetic field opposing the alternating magnetic field which is as strong as possible in order to significantly decrease the resulting inductance in the direction of the winding axis of the coil winding.

Preferably, the main flux direction and an auxiliary flux direction of the magnetic field which is different therefrom are determined by the permanent magnet of the armature, the coil winding being arranged on the armature so that the resulting inductances of the stator coils with respect to the main flux direction are minimal and with respect to the auxiliary flux direction are maximal. In this way, the position of the armature can be estimated by detecting the minimum and maximum inductance respectively.

According to a preferred embodiment, the winding axis of the coil winding on the armature runs parallel to the main flux direction.

Furthermore, the armature can be designed in the form of a rotor, wherein the at least one permanent magnet produces the armature magnetic field in a radial direction with respect to a rotor axis. In particular, the poles of the at least one permanent magnet can lie opposite one another with respect to an axis of rotation of the rotor.

According to a further preferred embodiment of the invention, a capacitor is provided on the armature which is connected in series with the coil winding in order to form a trap circuit with a predefined resonant frequency. The trap circuit increases the impedance in the main flux direction, in particular for an alternating magnetic field with a frequency close to the predefined resonant frequency, so that the resulting inductance in the main flux direction is changed enabling the anisotropy of the characteristic of the resulting inductance of the stator coils to be increased.

Furthermore, a resistor can be arranged in series with the coil winding and the capacitor in order to calibrate the trap circuit.

According to a further aspect of the present invention, an encoderless motor system is provided which has a synchronous motor described above. Furthermore, the motor system has a control unit for energizing the stator coils with a drive current, so that a drive magnetic field, which is formed in a different direction from the main flux direction, is produced depending on a position of the armature, wherein the control unit has a position detector unit in order to determine with the help of measuring signals the position of the armature based on an anisotropy of a resulting inductance of the stator coils produced by the coil winding.

The position detector unit can be provided in order to superimpose measuring signals, which produce the alternating magnetic field, on the drive currents, and to determine the position of the armature based on measuring currents which are dependent on the resulting inductance and which are produced by the measuring signals. In particular, the position detector unit can be designed to control the direction of the alternating magnetic field produced with the help of the measuring signals, so that the resulting inductance of the stator coils is either maximal or minimal, wherein the position of the armature can be determined depending on the direction of the alternating magnetic field produced by the measuring signals.

According to an embodiment of the invention, the main flux direction and an auxiliary flux direction of the magnetic field which is different therefrom are determined by the permanent magnet of the armature, the coil winding being arranged on the armature so that the resulting inductances of the stator coils with respect to the main flux direction are minimal and with respect to the auxiliary flux direction are maximal, the position detector unit being designed to control the alternating magnetic field in the direction of the main flux direction.

According to a further embodiment of the invention, a motor system is provided wherein a capacitor is provided on the armature which is connected in series with the coil winding in order to form a trap circuit with a predefined resonant frequency, the coil winding being arranged on the armature so that the resulting inductances of the stator coils with respect to the main flux direction are maximal and with respect to the auxiliary flux direction are minimal, the position detector unit being designed to control the alternating magnetic field in the direction of the main flux direction.

Preferably, a resistor is arranged in series with the coil winding and the capacitor.

According to a further aspect of the present invention, a method is provided for operating an encoderless motor system with one of the synchronous motors described above. The synchronous motor is operated depending on a position of the armature, wherein the position of the armature is determined based on an anisotropy of the resulting inductance in the stator coils due to the coil winding on the armature.

Furthermore, a direction of the alternating magnetic field produced with the help of measuring signals through the stator coils can be controlled so that the resulting inductance in the stator coils with respect to the direction of the alternating magnetic field is either maximal or minimal.

Preferably, the position of the armature is determined based on the direction in which the alternating magnetic field produced by the measuring signals is controlled.

Furthermore, it can be provided that the main flux direction and an auxiliary flux direction of the armature magnetic field which is different therefrom are determined by the permanent magnet of the armature, the coil winding being arranged on the armature so that the resulting inductances of the stator coils with respect to the main flux direction are minimal and with respect to the auxiliary flux direction are maximal, the alternating magnetic field being controlled in the direction of the main flux direction.

Alternatively, it can be provided that the main flux direction and an auxiliary flux direction of the armature magnetic field which is different therefrom are determined by the permanent magnet of the armature, the coil winding being connected in series with a capacitor in order to form a trap circuit with a resonant frequency, and being arranged on the armature so that the resulting inductance of the stator coils with respect to the main flux direction is maximal and with respect to the auxiliary flux direction is minimal, the alternating magnetic field being generated at the resonant frequency of the trap circuit and being controlled in the direction of the main flux direction.

BRIEF DESCRIPTION OF THE DRAWING

Preferred embodiments of the invention are explained in more detail below with reference to the attached drawings. In the drawing.

DETAILED DESCRIPTION OF PREFERRED EMBODIMENTS

Figure 1:
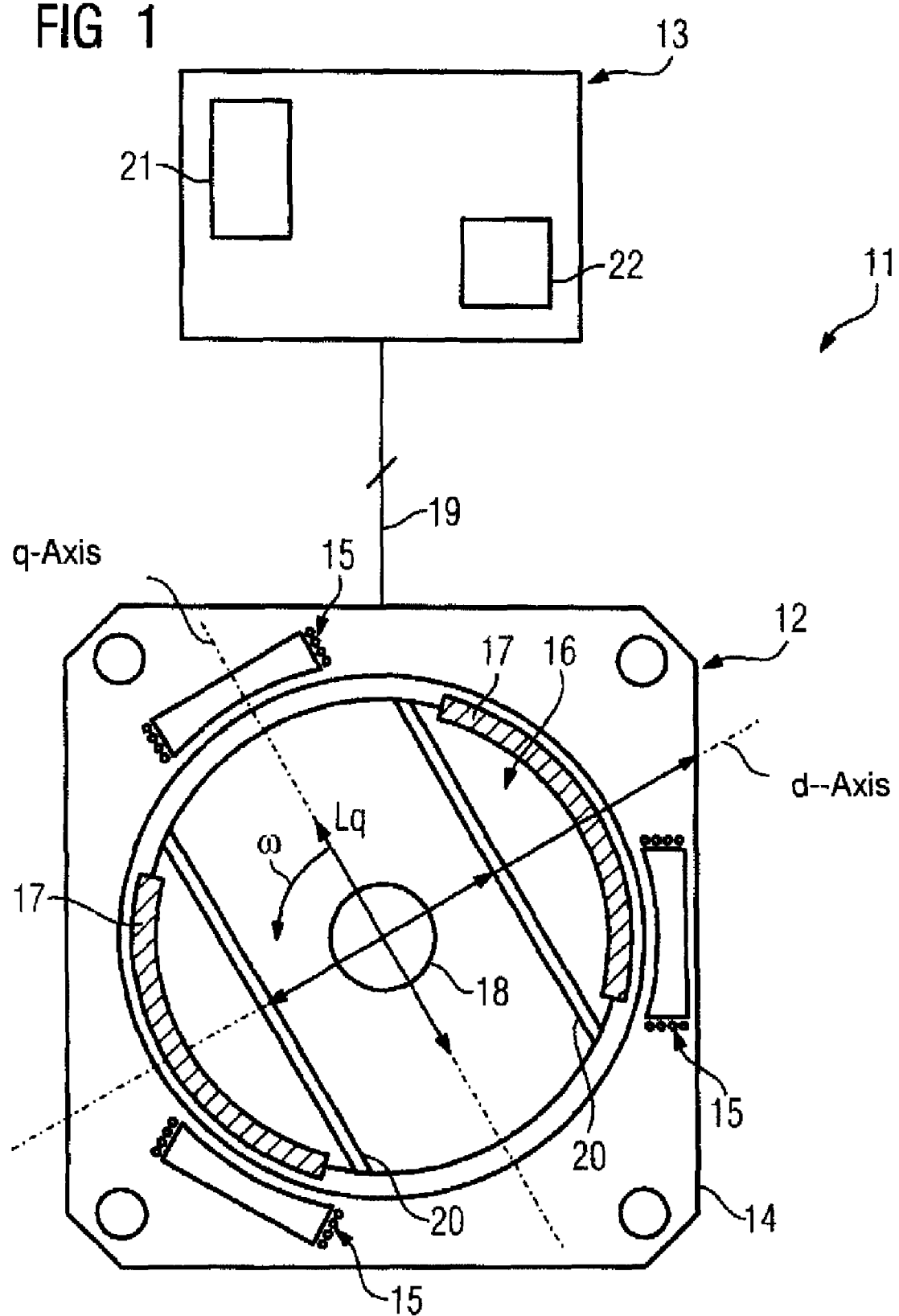
FIG. 1 shows a schematic representation of an encoderless motor system with a synchronous motor according to a first embodiment of the invention.

FIG. 1 shows a schematic representation of an encoderless motor system 11 with a synchronous motor 12 and a control unit 13 for operating the synchronous motor 12. The synchronous motor 12 has a housing 14 in which three stator coils 15 are arranged.

A rotor 16, which is rotatably arranged on the rotor axis 18, is arranged inside the housing 14. The rotor 16 has two permanent magnets 17 which are arranged on radially opposite sides with respect to a rotor axis 18 so that a magnetic main flux is produced in the direction of a d-axis of the armature magnetic field generated by the permanent magnets 17. The permanent magnets 17 are preferably designed in the form of shell magnets which are arranged along a circumferential edge of the cylindrical rotor 16. The pole coverage of the permanent magnets 17 normally has an order of magnitude of less than 100% e.g. 80%.

With respect to the rotor axis 18, the stator coils 15 are arranged offset from one another by 120°. The number of stator coils can essentially be chosen at will, but must be at least two. Each of the stator coils 15 can also be provided as a coil pair, the part coils of which lie opposite one another with respect to the rotor axis 18 and are connected together in series and in the same direction with respect to their winding directions.

The stator coils 15 are energized with drive signals by the control unit 13 by means of appropriate control wires 19 in order to drive the rotor 16. In addition, a magnetic field, which runs perpendicular to the d-axis in the direction of a q-axis, is generated on the rotor 16 with the help of the stator coils 15. In addition, the stator coils 15 are energized so that a resulting drive magnetic field is generated in the direction of the q-axis. The stator coils 15 are normally energized with drive signals, particularly in the form of voltage pulses, which in the exemplary embodiment shown produce three sinusoidal stator currents which are phase-shifted with respect to one another by 120° in the stator coils 15, assuming that the rotational speed of the rotor 16 is constant.

It is necessary to determine or estimate the rotor position so that it is possible for the applied drive magnetic field to always run perpendicular to the direction of the armature magnetic field produced by the permanent magnets. However, in an encoderless motor system, the rotor position is not determined directly with the help of suitable sensors; instead an anisotropy of the resulting inductance in the stator coils caused by the rotor position is used to determine the rotor position. The accuracy of estimating the position depends to a great extent on the strength of the variations in the resulting rotor-position-dependent inductances in the stator coils.

In order to determine the resulting inductances, in addition to the appropriate drive signals (stator currents), the stator coils 15 are also energized with respective measuring signals which are controlled so that an alternating magnetic field is applied in the direction of the d-axis of the rotor 16 by the stator coils 15. The application of such appropriate measuring signals has no effect on the operating behavior of the synchronous motor, as only the component of the magnetic field produced by the stator coils 15 in the direction of the q-axis is important for driving the rotor 16. The measuring signals are preferably pulsed voltage signals with a predefined frequency, e.g. 1 kHz or more, so that sinusoidal current characteristics of the resulting measuring currents are produced in the stator coils 15 depending on the inductance acting in the stator coils.

It is proposed that the rotor 16 be provided with one, two or more coil windings 20, the winding axes of which are in the same direction. Preferably, the coil windings 20 are aligned so that their winding axes run essentially parallel to the main flux direction, i.e. in the direction of the armature magnetic field determined by the position of the permanent magnets 17, i.e. in the direction of the d-axis. The coil windings 20 are arranged on the rotor 16, for example, in such a way that they run around cylindrical segments of the rotor 16 defined by permanent magnets 17 designed in the form of shell magnets. Alternatively, the coil winding 20 can also be provided centrally around the rotor axis 18 between two coil windings 20. The number of turns of the coil winding(s) 20 essentially determines the degree of anisotropy of the resulting inductance in the direction of the d-axis.

In this embodiment, the coil winding 20 is preferably short-circuited so that the appropriate measuring signals, which produce an alternating magnetic field in the direction of the d-axis, induce a current in the coil winding 20, which produces a magnetic field in opposition to the alternating magnetic field. This resulting magnetic field leads to a considerable weakening of the resulting inductance $L_d$ in the direction of the d-axis relating to the measuring signals. On the other hand, as the winding axis of the coil winding 20 runs perpendicular to the q-axis, the resulting inductance $L_q$ in the direction of the q-axis is not affected or not significantly affected.

The resulting inductance is an operand which can be calculated from the inductances of the stator coils 15, in particular with regard to the directions of the d-axis and the q-axis. In the above arrangement, the coil windings 20 effect a reduction in the resulting inductance in the direction of the d-axis, as the current induced in the coil winding 20 acts in opposition to the alternating magnetic field which is produced by the measuring signals in the stator coils 15. As a result, when they produce a magnetic field in the direction of the d-axis (i.e. in the direction of the winding axis of the coil windings 20), the measuring signals (normally a voltage signal) produce a higher associated current flow in the stator coils 15 than comparable measuring signals, which would produce an alternating magnetic field in the direction of the q-axis (i.e. in a different direction from the winding axis of the coil windings 20), would produce. In order to determine the associated current flow through the stator coils when drive currents also flow through the stator coils 15, the resulting total currents in the stator coils 15 can be divided into a component in the direction of the d-axis and a component in the direction of the q-axis.

To provide the drive currents for driving the rotor 16, the control unit 13 has a driver unit 21 which is connected to each of the stator coils 15. In addition, the control unit 13 has a position detector unit 22 which superimposes measuring signals in the form of voltage signals, which produce an alternating magnetic field in the direction of the d-axis, on the drive signals provided via the control wire 19. The alternating magnetic field produced by the measuring signals is permanently set in the direction of the d-axis by a suitable controller in which the measuring signals are controlled so that the resulting inductance with respect to the measuring signals becomes minimal. If the resulting inductance, which has been established by the measuring signals, is minimal, then the alternating magnetic field produced by the measuring signals runs parallel to the direction defined by the winding axes of the coil winding, i.e. in the main flux direction in the exemplary embodiment shown.

Although it is basically possible to rotate the winding axes of the coil windings 20 on the rotor 16 in opposition to the main flux direction defined by the permanent magnets 17, this can lead to the alternating magnetic field set up on the winding axes of the coil windings 20 affecting the drive magnetic field and therefore disturbing the operation of the synchronous motor 12.

The estimation of position in an encoderless motor system with the help of an anisotropy of the resulting inductance is sufficiently well known in principle from the prior art and is therefore not discussed further here.

Figure 2:
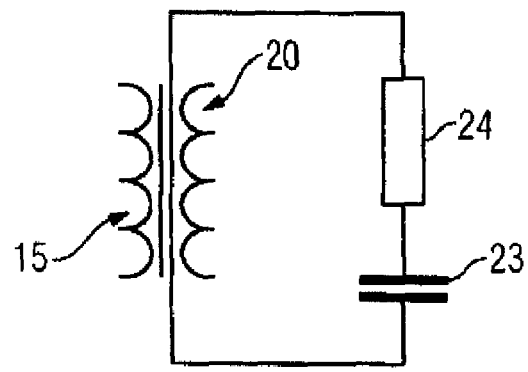
FIG. 2 shows a circuit diagram of a trap circuit, which is arranged on the armature side according to a further embodiment.

In a further embodiment of the present invention, the coil windings 20 are not short-circuited but connected in a trap circuit to a capacitor 23 (capacitance) to form a resonant circuit, such as is shown in the circuit diagram of FIG. 2. Furthermore, the trap circuit can also have a resistor 24 which is likewise connected in series with the coil winding and the capacitor 23. The trap circuit so formed has a resonant frequency $f_0$:

$$f_0 = \frac{1}{2\pi\sqrt{LC}}$$

Figure 3:
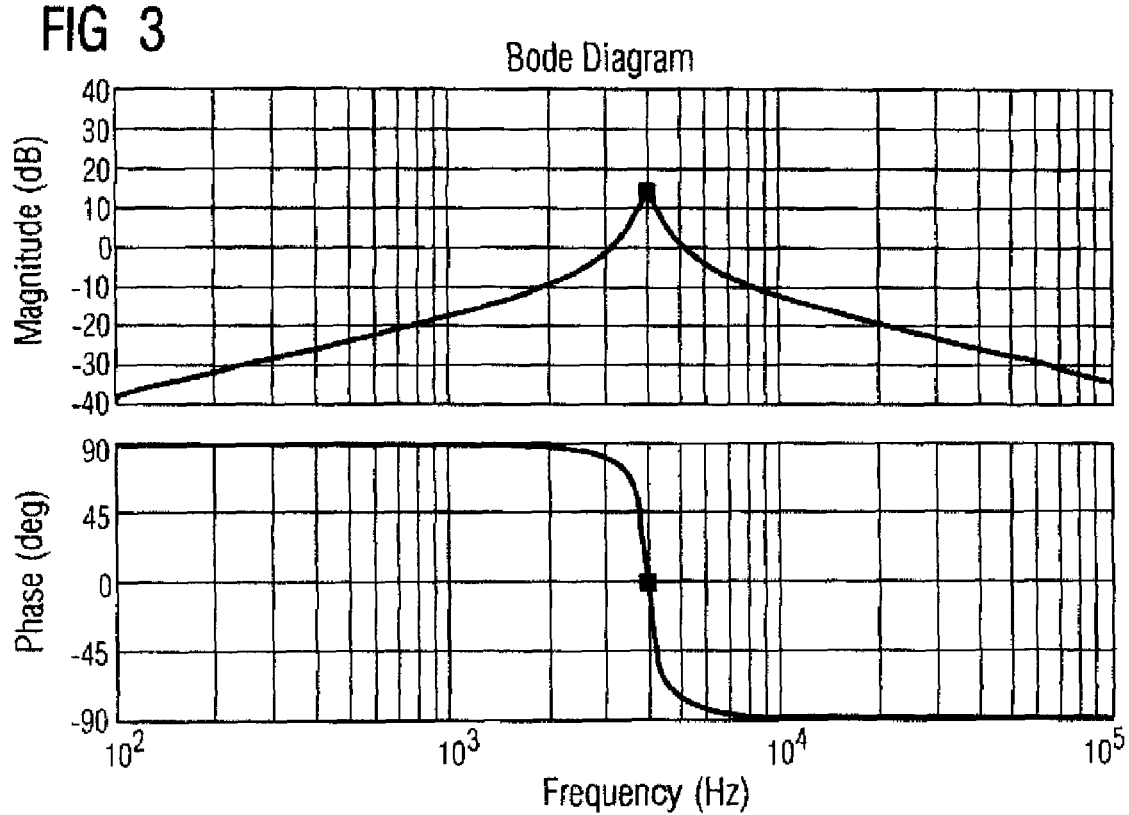
FIG. 3 shows a Bode diagram representing the impedance characteristic on the secondary side when using a trap circuit according to FIG. 2.

If, as described above, the measuring signals are applied to the stator coils 15 with a frequency which corresponds approximately to the resonant frequency $f_0$, then, as can be seen from FIG. 3, the impedance of the trap circuit and therefore also the resulting inductance in the direction of the d-axis increases considerably, as a result of which the rotor-position-dependent anisotropy of the resulting inductance can be changed in a similar manner.

In contrast to the short-circuited coil winding of the first embodiment, the use of a trap circuit causes the resulting inductance to increase considerably so that, in order to estimate the position, the measuring signals do not have to be controlled with respect to a minimum resulting inductance but with respect to a maximum resulting inductance in the direction of the d-axis. That is to say, the measuring signals are applied to the stator coils 15 in such a way that the components of the respective measuring current, which are produced by the measuring signals, are as maximal as possible.

What is claimed is:

1. A synchronous motor, comprising:
   a plurality of stator coils;
   an armature having at least one permanent magnet to produce an armature magnetic field in a main flux direction;
   a coil winding mounted on the armature to induce a resulting magnetic field by means of an alternating magnetic field applied with the help of the stator coils, in the direction of a winding axis of the coil winding, so that a resulting inductance of the stator coils with respect to a direction of the winding axis is different for different positions of the armature; and
   a capacitor provided on the armature and connected in series with the coil winding to form a trap circuit with a pre-defined resonant frequency.

2. The synchronous motor of claim 1, wherein the permanent magnet of the armature is determinative for the main flux direction and an auxiliary flux direction of the armature magnetic field which auxiliary flux direction is different from the main flux direction, said coil winding being arranged on the armature so that the resulting inductance of the stator coils with respect to the main flux direction is at a minimum and with respect to the auxiliary flux direction is at a maximum.

3. The synchronous motor of claim 1, wherein the winding axis of the coil winding runs parallel to the main flux direction.

4. The synchronous motor of claim 1, wherein the armature is designed in the form of a rotor defining a rotor axis, said permanent magnet producing the armature magnetic field in a radial direction with respect to the rotor axis.

5. The synchronous motor of claim 4, wherein poles of the permanent magnet are positioned in opposite relationship to one another with respect to an axis of rotation of the rotor.

6. The synchronous motor of claim 1, further comprising a resistor arranged in series with the coil winding and the capacitor.

7. An encoderless motor system, comprising:
   a synchronous motor having a plurality of stator coils, an armature having at least one permanent magnet to produce an armature magnetic field in a main flux direction, a coil winding mounted on the armature to induce a resulting magnetic field by means of an alternating magnetic field applied with the help of the stator coils, in the direction of a winding axis of the coil winding, so that a resulting inductance of the stator coils with respect to a direction of the winding axis is different for different positions of the armature, and a capacitor provided on the armature and connected in series with the coil winding to form a trap circuit with a pre-defined resonant frequency; and
   a control unit energizing the stator coils with a drive current, so that a drive magnetic field, which is formed in a different direction from the main flux direction, is produced depending on a position of the armature, wherein the control unit has a position detector unit which is responsive to measuring signals applied to the stator coils to determine the position of the armature based on an anisotropy of a resulting inductance of the stator coils produced by the coil winding.

8. The motor system of claim 7, wherein the position detector unit is constructed to superimpose measuring signals, which produce the alternating magnetic field, on the drive current, and to determine the position of the armature based on measuring currents which are dependent on the resulting inductance and produced by the measuring signals.

9. The motor system of claim 7, wherein the position detector unit is designed to control the direction of the alternating magnetic field produced with the assistance of the measuring signals, so that the resulting inductance of the stator coils is either at a maximum or at a minimum, wherein the position of the armature is determined depending on the direction of the alternating magnetic field.

10. The motor system of claim 7, wherein the permanent magnet of the armature is determinative for the main flux direction and an auxiliary flux direction of the magnetic field which auxiliary flux direction is different from the main flux direction, said coil winding being arranged on the armature so that the resulting inductance of the stator coils with respect to the main flux direction is at a minimum and with respect to the auxiliary flux direction is at a maximum, said position detector unit being designed to control the alternating magnetic field in the direction of the main flux direction.

11. The motor system of claim 7, wherein the coil winding is arranged on the armature such that the resulting inductance of the stator coils with respect to the main flux direction is at a maximum and at a minimum with respect to an auxiliary flux direction of the magnetic field which auxiliary flux direction is different from the main flux direction, said position detector unit being designed to control the alternating magnetic field in the direction of the main flux direction.

12. A method for operating an encoderless motor system with a synchronous motor, comprising the steps of:
    determining a position of an armature of the synchronous motor in response to an anisotropy of a resulting inductance in stator coils of the synchronous motor effected by a coil winding on the armature;
    operating the synchronous motor in dependence on the position of the armature of the synchronous motor;
    producing an armature magnetic field, which has a main flux direction and an auxiliary flux direction which is different from the main flux direction, by a permanent magnet of the armature;
    forming a trap circuit with a resonant frequency by connecting a coil winding in series with a capacitor, with the coil winding being arranged on the armature such that the resulting inductance in the stator coils with respect to the main flux direction is at a maximum and with respect to the auxiliary flux direction at a minimum;
    generating an alternating magnetic field with the resonant frequency of the trap circuit; and
    controlling the alternating magnetic field in a direction of the main flux direction.

13. The method of claim 12, further comprising the step of controlling a direction of the alternating magnetic field produced with the help of measuring signals through the stator coils such that the resulting inductance in the stator coils with respect to the direction of the alternating magnetic field is either at a maximum or at a minimum.

14. The method of claim 13, wherein the position of the armature is determined depending on the direction of the alternating magnetic field.

\* \* \* \* \*